Figure 1:
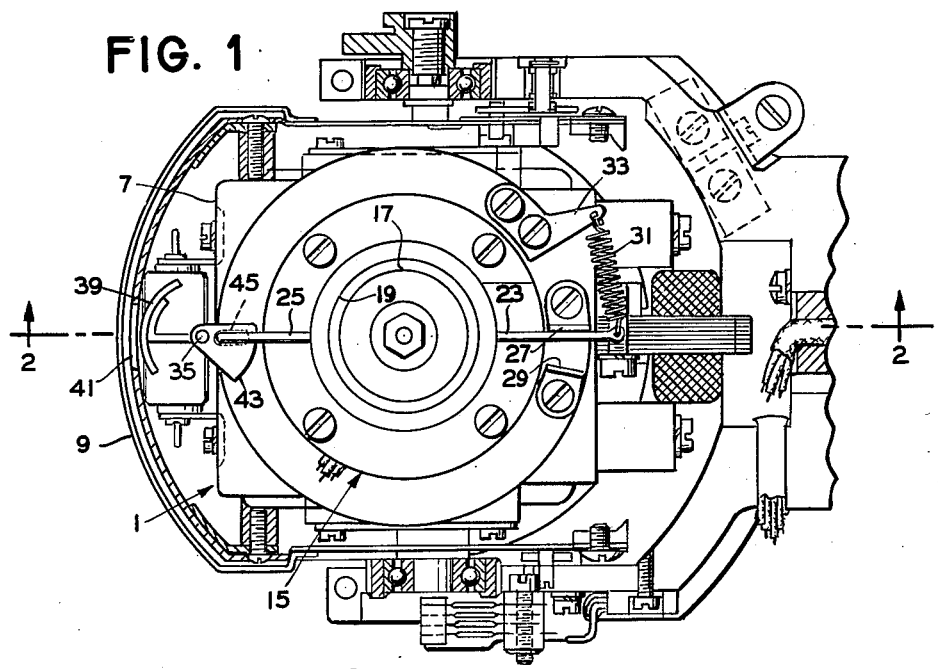

March 18, 1952 P. E. SEIFRIED 2,589,873
GYROSCOPIC INSTRUMENT
Filed Aug. 18, 1950

INVENTOR.
PAUL E. SEIFRIED
BY
ATTORNEY

Patented Mar. 18, 1952

2,589,873

UNITED STATES PATENT OFFICE 2,589,873

GYROSCOPIC INSTRUMENT

Paul E. Seifried, New City, N. Y., assignor to Bendix Aviation Corporation, Teterboro, N. J., a corporation of Delaware Application August 18, 1950, Serial No. 180,185

6 Claims. (Cl. 74—5.7)

The invention relates generally to instruments controlled by gyroscopes, and more particularly to instruments for use on aircraft for blind flying, such as artificial horizon or rate of turn indicators.

Gyroscopes used in indicators of the kind mentioned above require a relatively high predetermined rotor speed for proper operation of the indicators. If the gyroscope rotor runs below the predetermined speed or in the wrong direction, the instrument controlled thereby gives incorrect indication and the craft mounting the instrument may crash as a result.

The main object of the present invention is to indicate to the pilot whether or not the gyroscope rotor is rotating in the proper direction and has attained a predetermined speed.

Another object is to provide a simple, foolproof visible indication to the pilot.

The invention contemplates a magnetic drag cup having a magnetic element and a follower element associated therewith. One of the elements is driven by the gyroscope rotor and the other element is rotatable relative to the gyroscope case. The last-mentioned element operates a flag-like indicator, and yielding means resists rotation of the last-mentioned element relative to the gyroscope case. When the rotor is operating at normal speed in the proper direction, the flag-like indicator is moved by the torque of the drag cup to one position to indicate normal operation of the gyroscope, and when the speed of the rotor falls below the predetermined speed, or the rotor rotates in the wrong direction, the flag-like indicator is moved by the yielding means to another position to indicate faulty gyroscope operation.

The foregoing and other objects and advantages of the invention will appear more fully hereinafter from a consideration of the detailed description which follows, taken together with the accompanying drawing wherein one embodiment of the invention is illustrated. It is to be expressely understood, however, that the drawing is for the purposes of illustration and description only, and is not to be construed as defining the limits of the invention.

Figure 2:
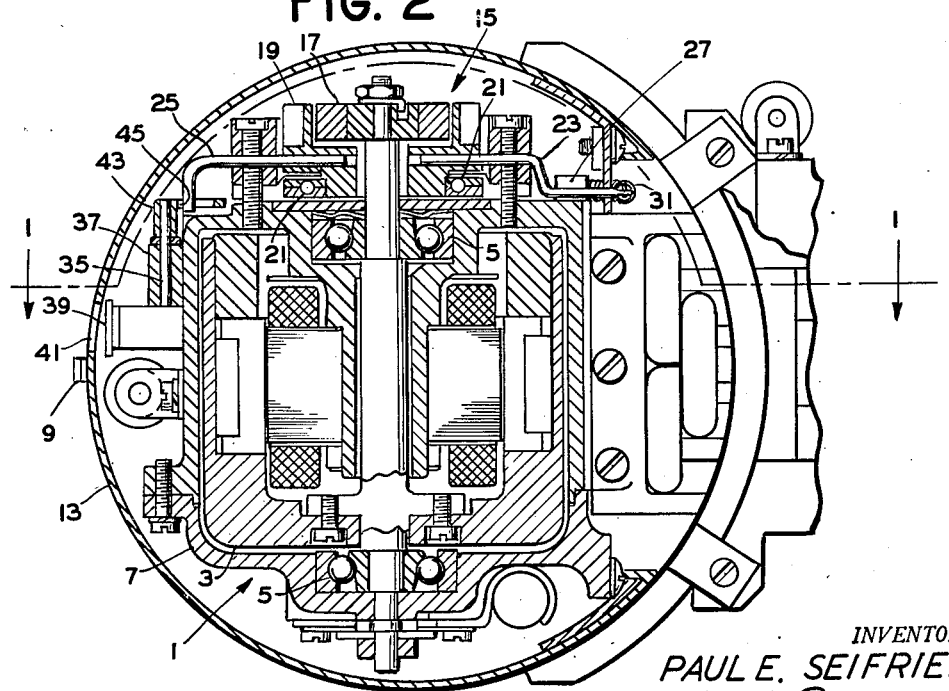

In the drawing, Figure 1 is a horizontal section taken approximately on the line 1—1 of Figure 2, and shows a gyro horizon indicator including a gyro rotor speed indicator constructed according to the invention.

Figure 2 is a vertical section taken approximately on the line 2—2 of Figure 1.

Referring now to the drawing for a more detailed description of the novel gyroscope rotor speed indicator of the present invention, the gyro rotor speed indicator is shown as incorporated in a gyro horizon indicator having a gyroscope 1 with its rotor 3 rotatable in bearings 5 within rotor case 7. The gyroscope controls a horizon bar 9 which indicates the attitude of the horizon relative to the craft. A magnetic drag cup 15 is driven by the rotor and includes a permanent magnet 17 secured to the rotor shaft and a cup-shaped member 19 surrounding and receiving the magnet and concentric therewith and supported by bearings 21 for rotation relative to the gyroscope casing.

A pair of radially extending arms 23, 25 are secured to member 19 and rotate therewith through a small angle, as determined by stops 27, 29 which engage arm 23. A tension spring 31 has one end attached to the outer end of arm 23 and its other end attached to a bracket 33 mounted on case 7, and urges arm 23 into engagement with stop 27.

A vertically disposed shaft 35 is mounted for rotation in a bearing 37 on case 7 and its lower end mounts a flag-like indicator 39 visible through a small window opening 41 in gyroscope housing 13. One half of the indicator may be painted white and the other half of the indicator may be painted black, or any other suitable contrasting colors may be used. A yoke plate 43 is mounted on the other end of shaft 35 and has an elongated aperture 45 which receives a downwardly extending portion of arm 25.

The torque characteristics of the drag cup assembly 15 and the tension of spring 31 are such so that when the gyro rotor is rotating at a predetermined speed, the torque is sufficient to overcome the resistance of spring 31, and member 19 rotates until rod 23 engages stop 29, whereupon indicator 39 moves to a position so that one half portion is visible through window opening 41 to indicate that the rotor is operating at proper speed. When the rotor is stationary or rotates in the wrong direction or its speed falls below the predetermined speed, spring 31 overcomes the torque exerted by the drag cup assembly, and rotates member 19 until rod 23 engages stop 27, whereupon indicator 39 is moved to a position so that the other half portion is visible through window opening 41.

The indication provided by the device described herein is simple and foolproof and provides visual indication to the pilot.

While the device of the present invention has been shown and described as incorporated in a gyro horizon indicator, it should be understood that the device may be used with any instrument utilizing a gyroscope and in which it is desirable to provide visual warning when the rotor rotates in the wrong direction or its speed falls below a predetermined speed.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In combination, a gyroscope having a rotor, a magnetic drag cup assembly driven by said rotor, indicating means operatively connected to said assembly, and yielding means resisting movement of said indicating means by said assembly, the torque exerted by said assembly when the gyro rotor is rotating at a predetermined speed overcoming the force of said resisting means.

2. In combination, a gyroscope having a rotor support, a rotor rotatable in said support, a magnetic drag cup assembly having a pair of relatively rotating elements, one of said elements being driven by said rotor, said other element being rotatable within limits relative to said support, resilient means urging said other element in one direction and relative rotation of said elements at a predetermined minimum speed moving said other element in the opposite direction against the force of said resilient means, and indicating means operatively connected to said other element to indicate whether or not said rotor is rotating at a predetermined minimum speed.

3. In a gyroscope having a rotor, variable torque means driven by said rotor, indicating means operatively connected to said variable torque means, the torque exerted by said torque means corresponding to the speed of rotation of the rotor, yielding means resisting movement of said indicating means by said variable torque means, the torque exerted by said variable torque means when the rotor is rotating at a predetermined speed overcoming the force of said yielding means and moving said indicating means to a predetermined position.

4. In a gyroscope having a rotor, variable torque means driven by said rotor, indicating means operatively connected to said variable torque means, the torque exerted by said torque means corresponding to the speed of rotation of the rotor, yielding means resisting movement of said indicating means by said variable torque means, the torque exerted by said variable torque means when the rotor is rotating at a predetermined speed overcoming the force of said yielding means and moving said indicating means to one position, and said yielding means moving said indicating means to another position when the speed of the rotor falls below the predetermined speed.

5. In a gyroscope having a rotor, a magnetic drag cup assembly driven by said rotor, indicating means operatively connected to said assembly and movable in one direction thereby, yielding means urging said indicating means in the opposite direction, a pair of limit stops for restricting movement of said indicating means in opposite directions, the torque exerted by said assembly when the gyro rotor is rotating at a predetermined speed overcoming the force of said yielding means and moving said indicating means in said one direction.

6. In a gyroscope having a support and a rotor rotatable in the support, a magnetic drag cup assembly having a cup-shaped element and a magnetic element received therein and concentric therewith, said magnetic element being adapted to be driven by the rotor and said cup-shaped element being rotatable relative to the support and having a pair of arms extending radially therefrom, a pair of limit stops fixed to the support and engaging one of said arms to limit rotation of said cup-shaped element relative to the support, an indicator mounted for rotation relative to the support and operatively connected to said other arm, a spring urging said one arm into engagement with one of said limit stops and moving said indicator to a position to indicate that the rotor is stationary or operating at subnormal speed, the torque exerted by said assembly when the gyro rotor is rotating at a predetermined speed overcoming the force of said spring and urging said one arm into engagement with the other limit stop and moving said indicator to a position to indicate that the rotor is operating at normal speed.

PAUL E. SEIFRIED.

REFERENCES CITED

The following references are of record in the file of this patent:

UNITED STATES PATENTS

| Number | Name | Date |
| --- | --- | --- |
| 790,960 | Hodgson | May 30, 1905 |
| 1,407,491 | Sperry | Feb. 21, 1922 |
| 2,292,090 | Reichel | Aug. 4, 1942 |
| 2,511,273 | Konet | June 13, 1950 |